(12) United States Patent
Igelka

(10) Patent No.: US 8,997,067 B2
(45) Date of Patent: Mar. 31, 2015

(54) UNIFIED SOFTWARE BUILD SYSTEM

(75) Inventor: Or Igelka, Ramat Gan (IL)

(73) Assignee: SAP SE, Walldorf (DE)

( * ) Notice: Subject to any disclaimer, the term of this patent is extended or adjusted under 35 U.S.C. 154(b) by 265 days.

(21) Appl. No.: 13/362,206

(22) Filed: Jan. 31, 2012

(65) Prior Publication Data

US 2013/0198717 A1 Aug. 1, 2013

(51) Int. Cl.
*G06F 9/45* (2006.01)
*G06F 9/44* (2006.01)

(52) U.S. Cl.
CPC .................................. *G06F 8/71* (2013.01)
USPC ............ 717/140; 717/146; 717/148; 717/151

(58) Field of Classification Search
CPC ............... G06F 8/71; G06F 8/10; G06F 8/20; G06F 11/3668; G06F 8/36; G06F 8/06; G06F 8/60; G06F 8/51; G06F 8/31
See application file for complete search history.

(56) References Cited

U.S. PATENT DOCUMENTS

| | | | |
|---|---|---|---|
| 6,298,476 B1 | 10/2001 | Misheski et al. | |
| 7,266,805 B2 | 9/2007 | Weidman et al. | |
| 7,844,958 B2* | 11/2010 | Colton et al. | 717/146 |
| 8,051,405 B2 | 11/2011 | Komissarchik et al. | |
| 8,132,153 B2* | 3/2012 | Subramanyam | 717/121 |
| 8,365,153 B2* | 1/2013 | Chen et al. | 717/140 |
| 8,601,433 B2* | 12/2013 | Son et al. | 717/106 |
| 2002/0059565 A1* | 5/2002 | Reyna et al. | 717/146 |
| 2003/0167421 A1* | 9/2003 | Klemm | 714/37 |
| 2005/0289527 A1* | 12/2005 | Illowsky et al. | 717/148 |
| 2006/0123045 A1* | 6/2006 | Chang et al. | 707/102 |
| 2007/0234316 A1* | 10/2007 | Bayerlein | 717/140 |
| 2009/0113402 A1* | 4/2009 | Chen et al. | 717/140 |
| 2009/0235239 A1* | 9/2009 | Lee et al. | 717/140 |
| 2010/0058302 A1* | 3/2010 | Broscaru et al. | 717/151 |
| 2012/0090021 A1* | 4/2012 | Luh et al. | 726/17 |
| 2012/0284696 A1* | 11/2012 | Koskinen | 717/140 |

OTHER PUBLICATIONS

Hai Jiang et al.; Compile/Run-time Support for Thread Migration; 2002 IEEE; 9 pages; <http://ieeexplore.ieee.org/stamp/stamp.jsp?tp=&arnumber=1015547>.*

(Continued)

*Primary Examiner* — Thuy Dao
*Assistant Examiner* — Cuong V Luu
(74) *Attorney, Agent, or Firm* — Fish & Richardson P.C.

(57) ABSTRACT

A computer-implemented method for generating one or more build system build files using a unified build system configuration file includes: receiving the unified build system configuration file in a computer system, the unified build system configuration file comprising at least one platform-independent build system configuration; generating, using the computer system, at least one platform-specific build system configuration from the at least one platform-independent build system configuration; selecting at least one template for the unified build system configuration file, the template selected from among templates corresponding to each of multiple platforms; generating the one or more build system build files for at least one of the multiple platforms using the platform-specific build system configuration and the selected template; and providing the generated one or more build system build files in response to the unified build system configuration file.

15 Claims, 4 Drawing Sheets

(56) References Cited

OTHER PUBLICATIONS

Marjan Mernik et al.; Compiler Interpreter Generator System LISA ; 2000 IEEE; pp. 1-10; <http://ieeexplore.ieee.org/stamp/stamp.jsp?tp=&arnumber=927021>.*

Susan J. Eggers et al.; Simultaneous Multithreading A Platform for Next-Generation Processors; 1997 IEEE; pp. 12-19; <http://ieeexplore.ieee.org/stamp/stamp.jsp?tp=&arnumber=621209>.*

Toru Kisuki et al.; A Feasibility Study in Iterative Compilation; 2006 Springer; pp. 121-132; <http://link.springer.com/chapter/10.1007/BFb0094916#page-1>.*

Bryan Catanzaro; Copperhead Compiling an Embedded Data Parallel Language ; 2011 ACM; <http://dl.acm.org/citation.cfm?id=1941562>.*

Shuai Che et al.; Rodinia A Benchmark Suite for Heterogeneous Computing; 2009 IEEE; pp. 44-54; <http://ieeexplore.ieee.org/stamp/stamp.jsp?tp=&arnumber=5306797>.*

"SAP NetWeaver How-To Guide: How to deploy Accelerated Application Delivery for SAP NetWeaver on Riverbed Steelhead," *SAP*, Sep. 2010, 36 pages.

"Accelerated Application Delivery for SAP NetWeaver," *SAP*, Mar. 2010, 25 pages.

"Cygwin User's Guide," *Cygwin*, 2011, 89 pages.

'Microsoft Visual Studio' [online]. Wikipedia, 2011, [retrieved on Jan. 31, 2012]. Retrieved from the Internet: <URL: http://en.wikipedia.org/w/index.php?title=Microsoft_Visual_Studio&oldid=410837847>, 14 pages.

'Solution (.sln) File' [online]. Msdn, 2005, [retrieved on Jan. 31, 2012]. Retrieved from the Internet: <URL: http://msdn.microsoft.com/en-us/library/bb165951(v=vs.80).aspx>, 4 pages.

'make (software)' [online]. Wikipedia, 2011, [retrieved on Jan. 31, 2012]. Retrieved from the Internet: <URL: http://en.wikipedia.org/w/index.php?title=Make_(software)&oldid=409470557>, 8 pages.

'Format of a .vcproj File' [online]. Msdn, 2003, [retrieved on Jan. 31, 2012]. Retrieved from the Internet: <URL: http://msdn.microsoft.com/en-us/library/2208a1f2(v=vs.71).aspx>, 6 pages.

'GNU Project' [online]. Wikipedia, 2011, [retrieved on Jan. 31, 2012]. Retrieved from the Internet: <URL: http://en.wikipedia.org/w/index.php?title=GNU_Project&oldid=408544161>, 4 pages.

'CMake' [online]. Wikipedia, 2011, [retrieved on Jan. 31, 2012]. Retrieved from the Internet: <URL: http://en.wikipedia.org/w/index.php?title=CMake&oldid=410552442>, 4 pages.

'Xcode' [online]. Wikipedia, 2011, [retrieved on Jan. 31, 2012]. Retrieved from the Internet: <URL: http://en.wikipedia.org/w/index.php?title=Xcode&oldid=410483753>, 3 pages.

'Xoreax Grid Engine' [online]. Wikipedia, 2011, [retrieved on Jan. 31, 2012]. Retrieved from the Internet: <URL: http://en.wikipedia.org/w/index.php?title=Xoreax_Grid_Engine&oldid=408217152>, 3 pages.

* cited by examiner

UNIFIED SOFTWARE BUILD SYSTEM

BACKGROUND

When developers create programs for software systems they often use code files that are then assembled into the final executable software. The code file(s) may be previously existing source code written for another project or program, or the code file(s) may be developed for the program currently being created. The developer will define how the software should be built from the code. This definition is tied to a particular operating system or other platform, and is embodied in one or more files sometimes called make files or build files.

In order for the program to be portable between platforms, build files dedicated to all relevant operating systems must be created. For example, to build a Microsoft Windows executable file (having the file type .exe), one can use the Visual Studio program from Microsoft Corp. As another example, to compile on Linux, one can use GNU make files.

SUMMARY

In a first aspect, a computer-implemented method for generating one or more build system build files using a unified build system configuration file includes: receiving the unified build system configuration file in a computer system, the unified build system configuration file comprising at least one platform-independent build system configuration; generating, using the computer system, at least one platform-specific build system configuration from the at least one platform-independent build system configuration; selecting at least one template for the unified build system configuration file, the template selected from among templates corresponding to each of multiple platforms; generating the one or more build system build files for at least one of the multiple platforms using the platform-specific build system configuration and the selected template; and providing the generated one or more build system build files in response to the unified build system configuration file.

In a second aspect, a computer program product is tangibly embodied in a non-transitory computer-readable storage medium and includes instructions that when executed by a processor perform a method for generating one or more build system build files using a unified build system configuration file. The method includes: receiving the unified build system configuration file in a computer system, the unified build system configuration file comprising at least one platform-independent build system configuration; generating, using the computer system, at least one platform-specific build system configuration from the at least one platform-independent build system configuration; selecting at least one template for the unified build system configuration file, the template selected from among templates corresponding to each of multiple platforms; generating the one or more build system build files for at least one of the multiple platforms using the platform-specific build system configuration and the selected template; and providing the generated one or more build system build files in response to the unified build system configuration file.

In a third aspect, a system includes: one or more processors; and a computer program product tangibly embodied in a non-transitory computer-readable storage medium and comprising instructions that when executed by the one or more processors causes the system to perform a method for generating one or more build system build files using a unified build system configuration file. The method includes: receiving the unified build system configuration file in a computer system, the unified build system configuration file comprising at least one platform-independent build system configuration; generating, using the computer system, at least one platform-specific build system configuration from the at least one platform-independent build system configuration; selecting at least one template for the unified build system configuration file, the template selected from among templates corresponding to each of multiple platforms; generating the one or more build system build files for at least one of the multiple platforms using the platform-specific build system configuration and the selected template; and providing the generated one or more build system build files in response to the unified build system configuration file.

Implementations can provide any or all of the following features. The unified build system configuration file includes a dependency of a first component on a second component, and the generated at least one build system build file reflects the dependency. The build system build file supports incremental updating based on a change in the unified build system configuration file. Multiple build system build files, for program building on separate ones of the multiple platforms, are generated in parallel with each other. The method further includes receiving at least one new template before receiving the unified build system configuration file, and adding the new template to the templates before selecting the at least one template for the unified build system configuration file. The method further comprising receiving at least one template revision before receiving the unified build system configuration file, and revising at least one of the templates based on the received template revision before selecting the at least one template for the unified build system configuration file.

Implementations can provide any or all of the following advantages. Build files can automatically be generated from a single unified build configuration file for all types of outputs or targets. A generic build system can be modeled in a practical way, and target-specific build system build files can be derived from it using target-specific templates. A unified build configuration file can support all types of target build systems. A unified build configuration file can support building on all different operating systems or other platforms. Compiler and linker flags are consolidated, and target-specific flags can be added, removed, set and/or changed. A unified build configuration file allows custom build steps to be inserted, including pre-, during- and post-building steps. Build files for different platforms can be generated in parallel with each other, while complying with a single build configuration and the same source files. Templates can be updated and new templates can be added.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes examples of using a unified build configuration file to automatically generate build system build files for one or more platforms. For example, when a developer has created source code for a particular application and wishes to export this application to multiple operating systems or other platforms, the unified build configuration file is updated with particular information about this application. A build system template is then selected for each relevant platform, and the information from the unified build configuration file is used in creating the respective build system build files.

Figure 1:
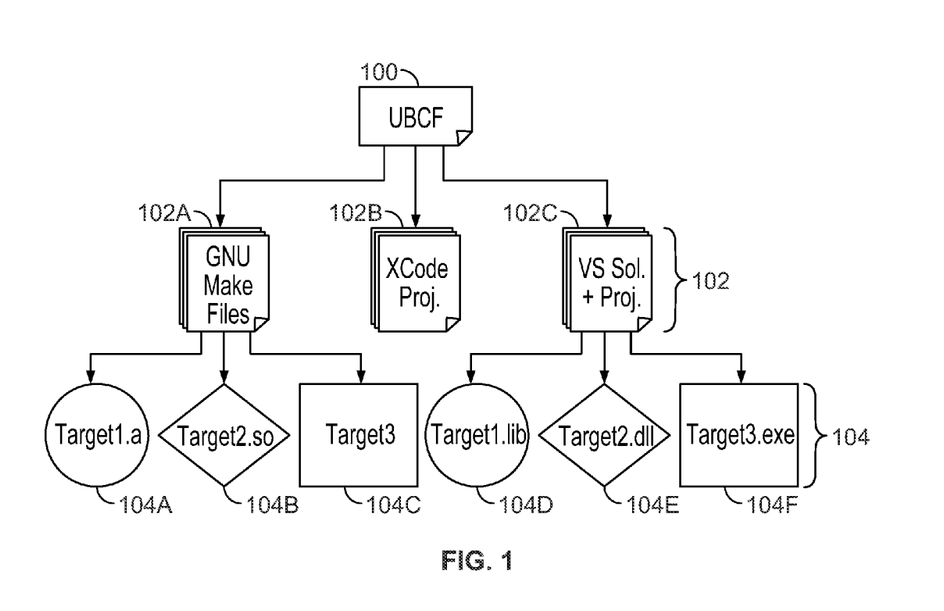
FIG. 1 schematically shows a unified build configuration file used to generate build system build files, which in turn can be used to generate targets for build systems.

FIG. 1 schematically shows a unified build configuration file 100 used to generate build system build files 102, which in turn can be used to generate targets 104 for build systems. The file 100 (labeled UBCF in the figure) can be written using any suitable code or script, and can be stored in any suitable file format. Examples of the file 100 include, but not limited to, an XML file, a text file (e.g., with filename extension .txt), or a word processing file (e.g., with filename extension .doc). A developer can create the file 100 to specify what source code files, etc., are included in a particular program, and how to assemble them. The file 100 therefore includes a build system configuration for any platform for which the program should be built. An example of the file 100 will be described below with reference to FIG. 4.

One or more of the build system build files 102 can be generated using the file 100. The build system build files 102 for different platforms can be generated in parallel with each other from the same file 100. As another example, one can first generate the build system build files for a particular platform, and later, using the same or an updated version of the file 100, generate additional build system build files 102 for at least one other platform.

In this example, the build system build files 102 include GNU make files 102A for a Linux operating system, XCode project files 102B for an Apple Macintosh operating system, and Virtual Studio solution and project files 102C for a Microsoft Windows operating system. That is, each of the sets of build system build files 102 is configured to be used on its corresponding platform to build the program, in a way compatible with that platform, from source code components that were specified in the file 100. Build files for more, fewer or other platforms can be generated in other situations.

Each of the build system build files 102 is used to generate the targets 104 for its respective platform. Of the targets 104 from the GNU make files 102A (i.e., for the Linux-based system), the present example shows, for illustration: a static library file 104A, here labeled "Target1.a"; a dynamic library file 102B, here labeled "Target2.so", and an executable file 104C, here labeled "Target3". As a similar example, the targets 104 from the Virtual Studio solution and project files 102C (i.e., for the Microsoft Windows operating system) here include a static library file 104D labeled "Target1.lib", a dynamic library file 102E labeled "Target2.dll", and an executable file 104F labeled "Target3.exe". The target files 104 for the XCode project files 102B are not shown in this example but could be generated. Also, the number and types of the targets 104 shown here are for illustration only, and other numbers and/or types can be used.

That is, from the unified build configuration file 100 one or more of the build system build files 102 can be generated, as needed, and the build system build files 102 can then be used to build the corresponding system for the relevant platform(s). An example of this will now be described.

Figure 2:
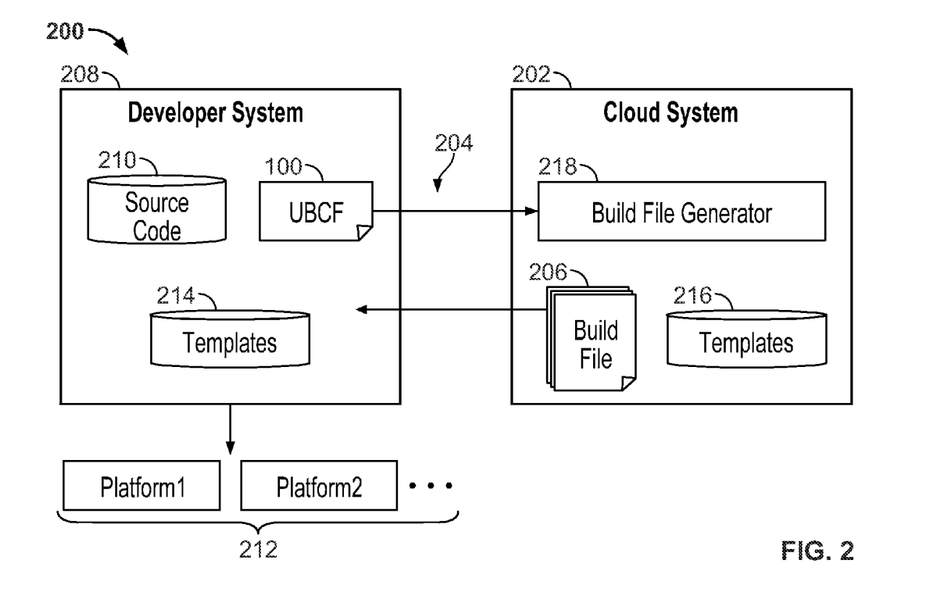
FIG. 2 shows a network where a cloud system provides a service for generating build files.

FIG. 2 shows a network 200 where a cloud system 202 provides a service 204 for generating build files 206. The cloud system 202 can be implemented using any suitable combination of hardware, firmware and software, for example in form of one or more server devices. The cloud system 202 operates at least in part according to the cloud computing paradigm where software functionality is delivered as a service, generally speaking by having the software reside and be executed on one or more systems for the benefit of one or more computers or other devices located elsewhere. In the network 200, the cloud system 202 can communicate with other devices using any suitable network protocol and transmission medium. For example, the cloud system 202 can be connected to the internet and/or to one or more intranets.

The network 200 here includes a developer system 208 that one or more developers use in the process of developing software. The developer system can include any suitable tools (not shown) for various tasks of the development process, such as, but not limited to, an IDE (Integrated Development Environment), a source code editor, a compiler, an interpreter, a linker, build tools, build automation tools, and a debugger. Here, a repository 210 includes source code developed for one or more programs or solutions. For example, the source code can include, but is not limited to, code written in any suitable programming language (e.g., C++).

In this example, the developer wishes to make the developed program flexibly portable, for example so that the program can be built for, and executed on, a multitude of platforms 212. The platforms 212 can include individual operating systems (e.g., Microsoft Windows or Linux). In some implementations, at least one of the platforms 212 includes portable processing devices, such as, but not limited to, smartphones or other mobile phones.

In some implementations, the developer creates templates 214 for each of the platforms 212 that is relevant to the current program. Each template is designated to one of the platforms and contains the basic structure of the build file(s) necessary for building a system on that platform. For example, the template 214 for the Microsoft Windows operating system contains information regarding static and dynamic libraries and execution files. In other implementations, the developer does not create templates but rather uses one or more existing templates. Such existing templates can be stored on the cloud system 202, to name just one example.

Some or all of the templates 214 can be uploaded to the cloud system 202 from the developer system 208, where they can be kept in a template repository 216. As other examples, one or more of the templates in the repository 216 may have been uploaded by another entity, or may have been created by the entity operating the cloud system 202. Any type of storage suitable for the templates can be used. In some implementations, the cloud system 202 can provide the service 204 to each of a number of service consumers (including the developer system 208), and the template repository 216 can then have stored therein templates from multiple consumers, pertaining to a variety of platforms.

The developer also forwards the unified build configuration file 100 to the cloud system 202. In some implementations, the cloud system provides an online page (or other interface) for the service, and this page guides the developer through the process of uploading the file 100. In some implementations, such a page can provide one or more wizards, for example to help and guide the developer in creating the file 100. For example, when the file 100 contains build configurations for multiple platforms, the developer can specify that build files for only some of the platforms should presently be generated. Such specification can be made inside the file 100, or in connection with the developer requesting the service 204, or can be communicated to the cloud system 202 in another way. In some implementations, instead of uploading a template, the developer (e.g., using the developer system 208) can provide one or more matching operating system-specific flags to the cloud system 202. For example, the flag(s) can be added to the file 100. Such flag(s) can properly alter the build files that are generated from the templates already stored on the cloud system. In some implementations, the developer can upload one or more templates and the operating system-specific flag(s).

The cloud system 202 includes a build file generator 218 that receives the unified build configuration file 100 (or at least its contents) that the developer submitted, selects the appropriate template(s) from the template repository 216, and generates the build file(s) 206 in accordance with the developer's request. For example, the build file generator 218 consolidates the compilation and linkage flags, and automatically sets them for the target of the respective platform. In some implementations, the service consumer can specify (e.g., in the file 100 or otherwise) that one or more flags should be added, removed, set or changed for a particular target.

In some implementations one or more custom steps can be defined, and thereby affect the build for the corresponding platform. For example, such a custom step can be performed before the build is done, during (e.g., as part of) the build, or after the build is done. The custom step(s) can be defined in the file 100 or otherwise communicated.

The cloud system 202 then delivers the generated build file(s) 206 to the developer system 208. In some implementations, the generated build files 206 include GNU make files for generating a Linux version of the application, XCode project files for generating a Mac version, and/or Virtual Studio solution and project files for generating a Windows version. Other platforms can be covered instead of, or in addition to, the ones mentioned here. For example, and without limitation, CMake or NMake files can be generated. In some implementations, one or more of the build files can be forwarded to separate locations, such as to another system.

When the developer system 208 receives the generated build file(s) 206, the developer can build the system(s) for the appropriate platform(s). For example, any or all of the targets 104 (FIG. 1) can be generated. The mentioned target types are examples only. In some implementations, target types can include, but are not limited to, exe, bin, lib, a, dll, so, shlb, or app, to name just a few additional examples.

A build configuration has one or more dependencies, for example such that one source code file depends on at least one other source code file. Such dependencies are projected into generated build files, and these build files therefore contain the information about the order in which to build the program's components, and which code file should be incorporated into each component. This preservation of dependencies also allows an incremental build. For example, when a code file changes, only the needed components are rebuilt.

Figure 3:
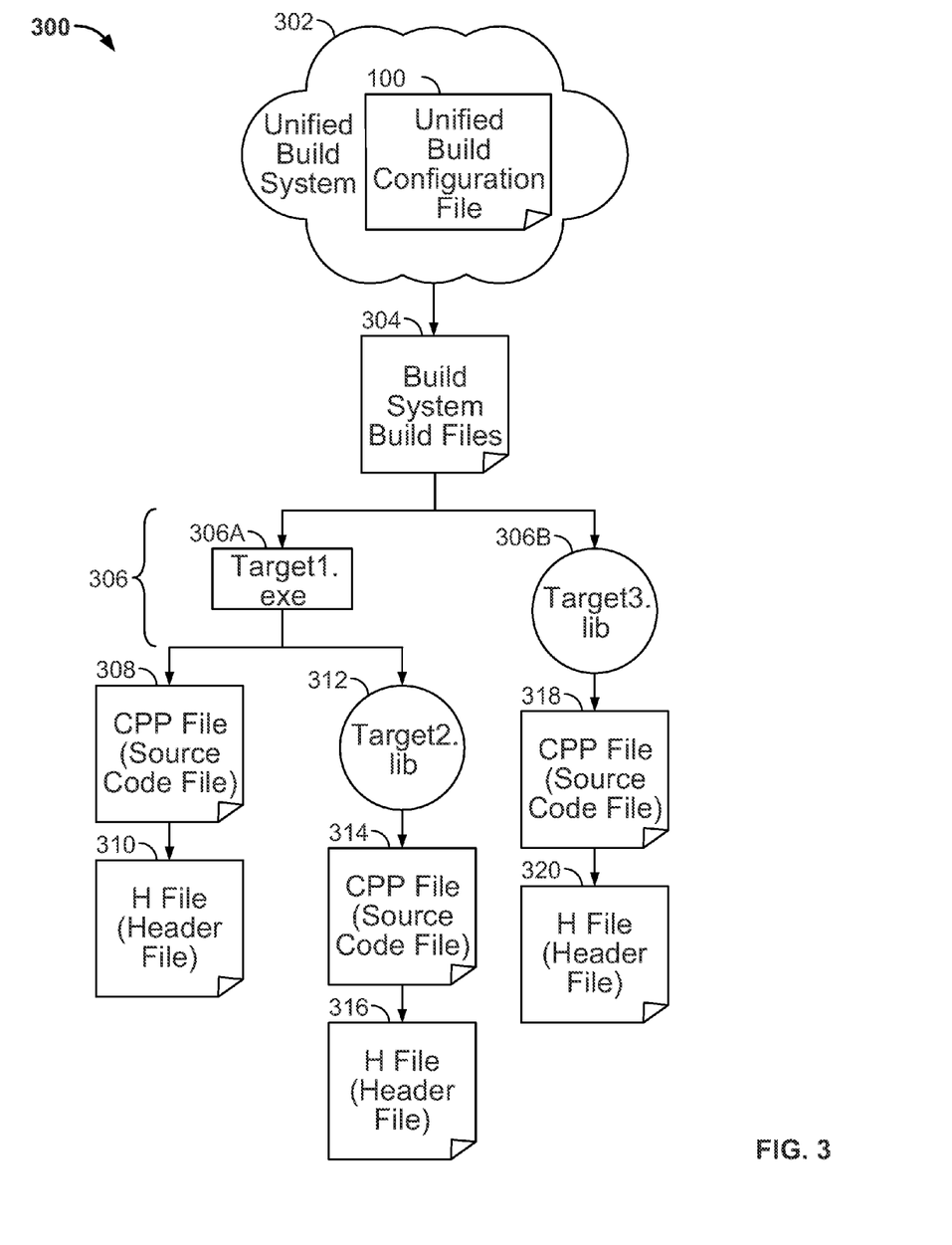
FIG. 3 shows an example of a build system hierarchy with dependencies between components.

FIG. 3 shows an example of a build system hierarchy 300 with dependencies between components. Briefly, the hierarchy 300 schematically shows that a unified build system 302 uses the unified build configuration file 100 to generate one or more build system build files 304, in this example labeled "Build System". That is, the build system build files 304 are build files for a particular build system. The build system build files 304 are configured for generating one or more targets 306 for the particular build system platform, here including a first target 306A (labeled "Target1.exe") and a second target 306B (labeled "Target3.lib").

The first target 306A here depends on a source code file 308 (labeled "CPP File") which here in turn depends on a header file 310 (labeled "H File"). The first target 306A here also depends on a library file 312 (labeled "Target2.lib") dependent on another source code file 314 (also labeled "CPP File"), which in turn depends on another header file 316 (also labeled "H File"). Similarly, the second target 306B depends on yet another source code file 318 (likewise labeled "CPP File") which in turn depends on yet another header file 320 (likewise labeled "H File"). While dependencies between CPP and H files are used here as examples, other dependencies can also exist. For example, a target can depend on one or more other targets, and/or a target can depend on one or more code or source files.

These and other dependencies are automatically taken into account by analyzing the source code and the unified build configuration file 100. Here, because the source code file 308 includes the header file 310, the automatically generated build files will contain a dependency of this source code file (e.g., a CPP file) on this particular header file (e.g., an H file), without a need for the developer to explicitly write this dependency into the build configuration.

For example, if the header file 316 is changed, then as a consequence the source code file 314, the library file 312 and the target 306A must be rebuilt. By contrast, if the source code file 308 were changed, this would not in and of itself require any rebuilding of the library file 312. Rather, one would recompile the modified source code file 308, and then re-link the target 306A using the unchanged library file 312 and the object file, which has been recompiled due to the change in the source code file 308.

Figure 4:
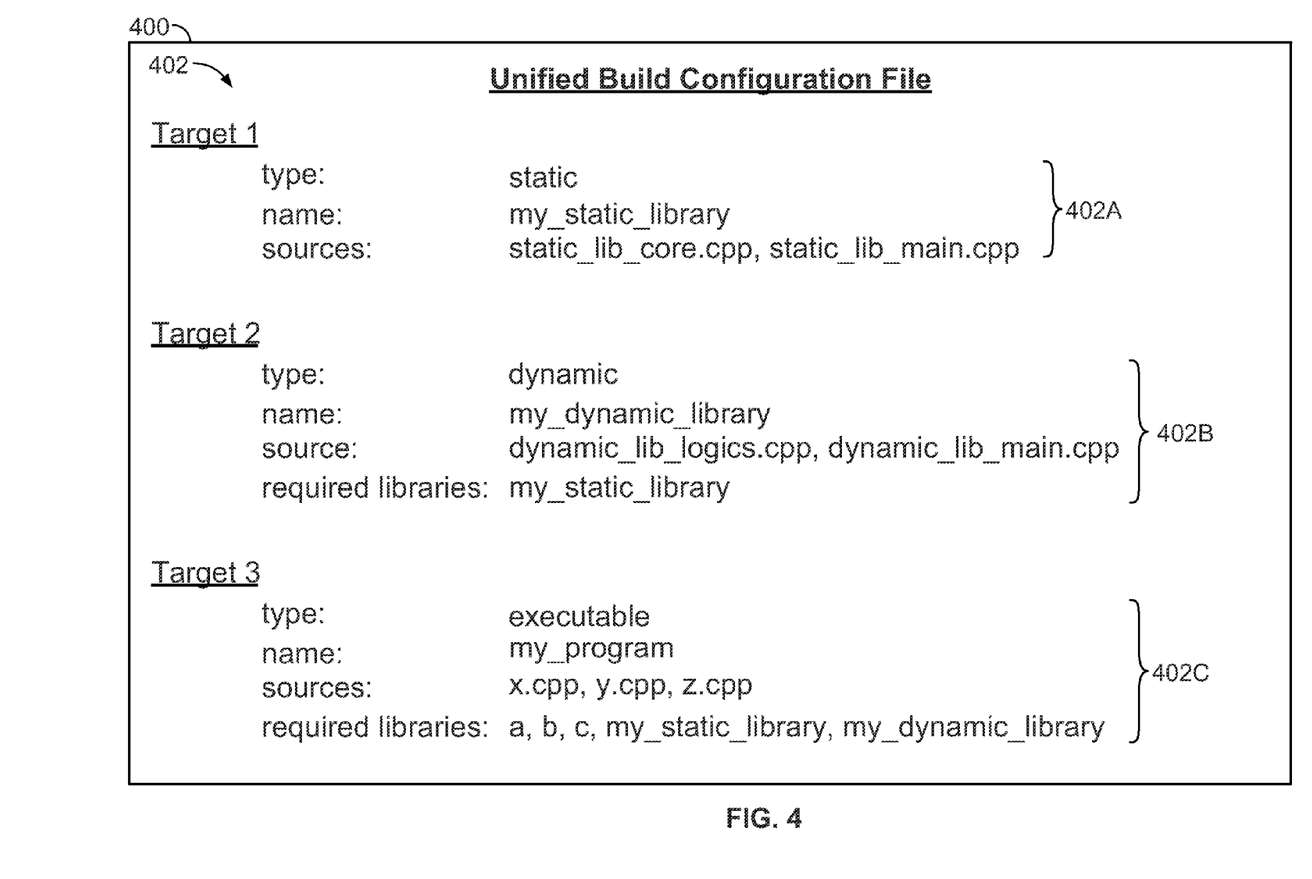
FIG. 4 shows an example of a unified build configuration file.

FIG. 4 shows an example of a unified build configuration file 400. This file can contain any number of configurations 402, each corresponding to a respective target to be built on any desired platform for which build files can be generated. The configuration 402 here includes "Target 1", "Target 2" and "Target 3". For example, the configuration 402A relates to a static library and specifies that Target 1 should be a file named "my_static_library" and the sources for this target are the source code files "static_lib_core.cpp" and "static_lib_main.cpp". Similarly for the configuration 402B which relates to a dynamic library.

For the configuration 402C, in turn, whose target is called "my_program", the source code files are "x.cpp", "y.cpp" and "z.cpp". These will be compiled, for example into object files (e.g., having filetype .obj) for Microsoft Windows or Linux, and will be used during linkage when everything is linked to create the program (e.g., "my_program"). The configuration 402C also specifies that the libraries a, b, c, my_static_library and my_dynamic_library are needed. In some situations, the unified build configuration file 400 also or instead includes build configurations relating to one or more other platforms.

In some implementations, the file 400 can contain at least one platform specific definition. The unified build system (e.g., the system 302 in FIG. 3) will then use that definition only regarding the specific platform(s). For example, the file 400 can then also include another component that indicates one or more other particular components to be used in situations that do not involve the specific platform(s). Such component can specify one or more other libraries, to name just one example.

In a Microsoft Windows operating system, for example, one or more modules can be implemented as a dynamic library (i.e., a .dll file). In some such implementations, the system then generates a .vcproj file that defines the build of this dynamic library. That is, the system knows the relevant version of the module, it will build the source codes listed in the unified build configuration file 400, and therefore knows how to build this particular module. Another .vcproj file can define one or more other components. In some implementations, the system has a wrapping solution that includes such .vcproj files, and this solution indicates relevant dependencies.

In some situations, the build files are generated shortly before the program should be assembled and installed. First, the generation of the build files can be done on any operating system and the system is therefore portable in that sense. Second, the build file(s) can be generated for any arbitrary operating system or other platform and the system is therefore portable in that sense as well.

Once build files have been generated, one or more build accelerators dedicated to the particular build operating system can be used. For example, this can provide the capability of building using multiple processes and/or using distributed computing techniques which can therefore further decrease the build time.

New templates can be added (e.g., for additional derived build systems), existing templates can be removed, or an existing template can be updated. For example, a source control management (SCM) system can be used for such an upgrade, or an existing template can otherwise be updated to a newer version of the specific build system. That is, to upgrade a build environment on some operating system, one only needs to upgrade the template used for the automatic generation of build files for this build system.

Some implementations provide the ability to initiate builds either on remote build servers or locally using the automatically generated build file(s). For example, one can schedule builds, run builds simultaneously on different servers, automatically check for updates through an SCM system, monitor the status of currently running (or finished) builds, and remotely or locally control the build processes (e.g., by start, stop, restart, pause, or resume commands).

Figure 5:
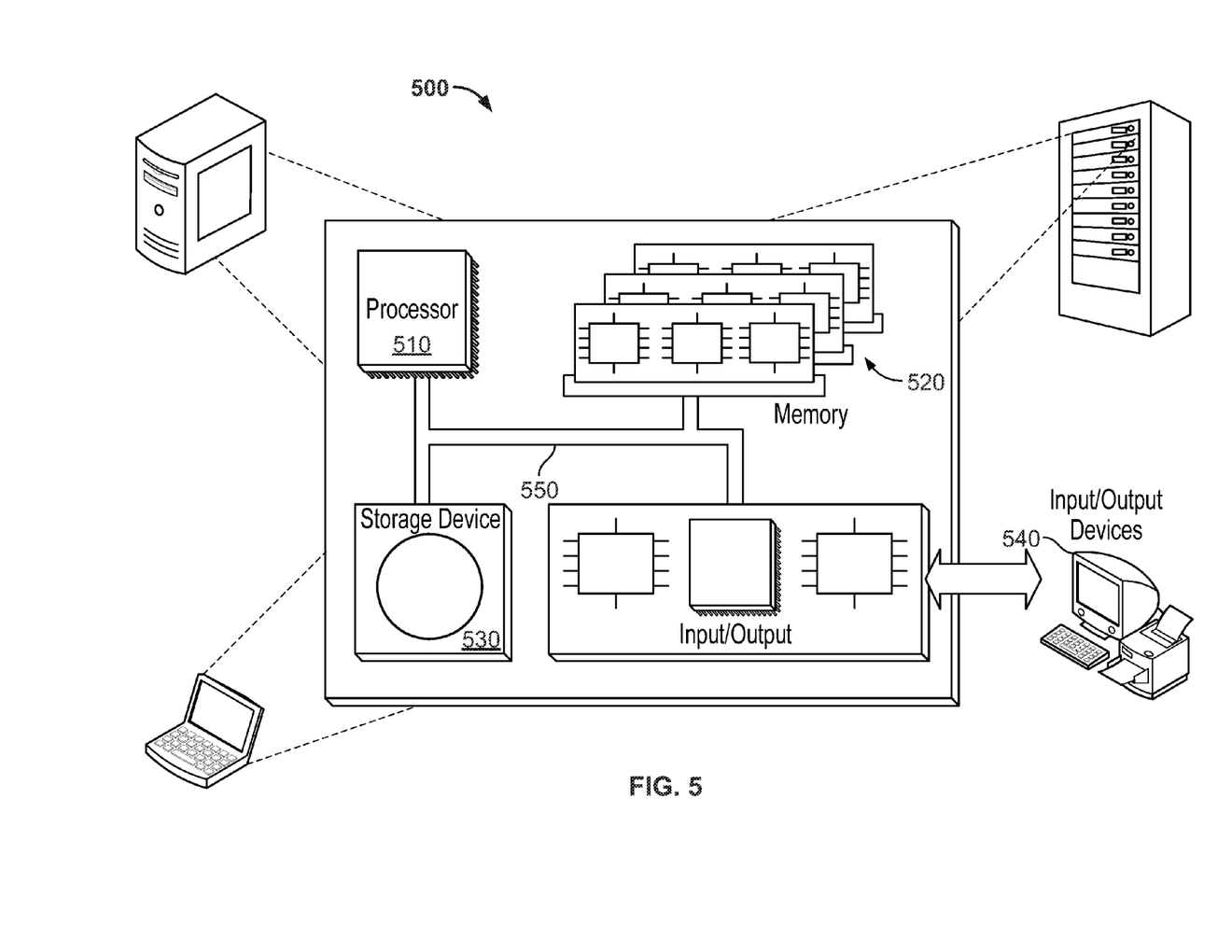
FIG. 5 is a block diagram of a computing system that can be used in connection with computer-implemented methods described in this document.

FIG. 5 is a schematic diagram of a generic computer system 500. The system 500 can be used for the operations described in association with any of the computer-implement methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. The memory 520 is a volatile memory unit in some implementations and is a non-volatile memory unit in other implementations.

The storage device 530 is capable of providing mass storage for the system 500. In one implementation, the storage device 530 is a computer-readable medium. In various different implementations, the storage device 530 may be a floppy disk device, a hard disk device, an optical disk device, a disk on key (e.g., a USB memory) or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method for generating a plurality of build system build files using a unified build system configuration file, the method comprising:

receiving, by a computer system, the unified build system configuration file from a developer computer system, the unified build system configuration file comprising at least one platform-independent build system configuration;

generating, by the computer system, at least one platform-specific build system configuration from the at least one platform-independent build system configuration by consolidating compilation and linkage flags and automatically setting flags based on a respective platform, wherein the flags alter the one or more build system build files generated from at least one template stored on a cloud system;

selecting the at least one template for the unified build system configuration file, the template selected from among templates corresponding to each of multiple platforms;

generating the plurality of build system build files for at least one of the multiple platforms using the platform-specific build system configuration and the selected template, wherein the plurality of build system build files, for program building on separate ones of the multiple platforms, are generated in parallel with each other and are altered by the flags; and providing, from the computer system and to the developer computer system, the plurality of build system build files in response to the unified build system configuration file.

2. The computer-implemented method of claim 1, wherein the unified build system configuration file includes a dependency of a first component on a second component, and wherein the generated at least one build system build file reflects the dependency.

3. The computer-implemented method of claim 1, wherein the build system build file supports incremental updating based on a change in the unified build system configuration file.

4. The computer-implemented method of claim 1, further comprising receiving at least one new template before receiving the unified build system configuration file, and adding the new template to the templates before selecting the at least one template for the unified build system configuration file.

5. The computer-implemented method of claim 1, further comprising receiving at least one template revision before receiving the unified build system configuration file, and revising at least one of the templates based on the received template revision before selecting the at least one template for the unified build system configuration file.

6. A computer program product tangibly embodied in a non-transitory computer-readable storage medium and comprising instructions that when executed by a processor perform a method for generating a plurality of build system build files using a unified build system configuration file, the method comprising:

receiving, by a computer system, the unified build system configuration file from a developer computer system, the unified build system configuration file comprising at least one platform-independent build system configuration;

generating, by the computer system, at least one platform-specific build system configuration from the at least one platform-independent build system configuration by consolidating compilation and linkage flags and automatically setting flags based on a respective platform, wherein the flags alter the one or more build system build files generated from at least one template stored on a cloud system;

selecting the at least one template for the unified build system configuration file, the template selected from among templates corresponding to each of multiple platforms;

generating the plurality of build system build files for at least one of the multiple platforms using the platform-specific build system configuration and the selected template, wherein the plurality of build system build files, for program building on separate ones of the multiple platforms, are generated in parallel with each other and are altered by the flags; and providing, from the computer system and to the developer computer system, the generated one or more build system build files in response to the unified build system configuration file.

7. The computer program product of claim 6, wherein the unified build system configuration file includes a dependency of a first component on a second component, and wherein the generated at least one build system build file reflects the dependency.

8. The computer program product of claim 6, wherein the build system build file supports incremental updating based on a change in the unified build system configuration file.

9. The computer program product of claim 6, the method further comprising receiving at least one new template before receiving the unified build system configuration file, and adding the new template to the templates before selecting the at least one template for the unified build system configuration file.

10. The computer program product of claim 6, the method further comprising receiving at least one template revision before receiving the unified build system configuration file, and revising at least one of the templates based on the received template revision before selecting the at least one template for the unified build system configuration file.

11. A system comprising:

one or more processors; and a computer program product tangibly embodied in a non-transitory computer-readable storage medium and comprising instructions that when executed by the one or more processors causes the system to perform a method for generating a plurality of build system build files using a unified build system configuration file, the method comprising:

receiving, by a computer system, the unified build system configuration file from a developer computer system, the unified build system configuration file comprising at least one platform-independent build system configuration;

generating, by the computer system, at least one platform-specific build system configuration from the at least one platform-independent build system configuration by consolidating compilation and linkage flags and automatically setting flags based on a respective platform, wherein the flags alter the one or more build system build files generated from at least one template stored on a cloud system;

selecting the at least one template for the unified build system configuration file, the template selected from among templates corresponding to each of multiple platforms;

generating the plurality of build system build files for at least one of the multiple platforms using the platform-specific build system configuration and the selected template, wherein the plurality of build system build files, for program building on separate ones of the multiple platforms, are generated in parallel with each other and are altered by the flags; and providing, from the computer system and to the developer computer system, the plurality of build system build files in response to the unified build system configuration file.

12. The system of claim 11, wherein the unified build system configuration file includes a dependency of a first component on a second component, and wherein the generated at least one build system build file reflects the dependency.

13. The system of claim 11, wherein the build system build file supports incremental updating based on a change in the unified build system configuration file.

14. The system of claim 11, the method further comprising receiving at least one new template before receiving the unified build system configuration file, and adding the new template to the templates before selecting the at least one template for the unified build system configuration file.

15. The system of claim 11, the method further comprising receiving at least one template revision before receiving the unified build system configuration file, and revising at least one of the templates based on the received template revision before selecting the at least one template for the unified build system configuration file.

* * * * *